United States Patent
Sterzel

(10) Patent No.: US 7,368,097 B2
(45) Date of Patent: *May 6, 2008

(54) PREPARATION OF NANOCRYSTALLINE LITHIUM TITANATE SPINELS

(75) Inventor: Hans-Josef Sterzel, Dannstadt-Schauernheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 568 days.

This patent is subject to a terminal disclaimer.

(21) Appl. No.: 10/829,175

(22) Filed: Apr. 22, 2004

(65) Prior Publication Data

US 2004/0217335 A1   Nov. 4, 2004

(30) Foreign Application Priority Data

Apr. 29, 2003   (DE) ................ 103 19 464

(51) Int. Cl.
C01B 13/36  (2006.01)
C01G 23/053 (2006.01)
H01M 4/48   (2006.01)
H01B 1/08   (2006.01)

(52) U.S. Cl. .............. 423/598; 423/594.12; 252/182.1; 252/518.1; 252/519.1; 252/519.12; 252/520.2; 501/10; 501/12; 501/134; 977/811; 429/231.1; 429/231.5; 429/231.95

(58) Field of Classification Search ............ 252/182.1, 252/500, 518.1, 519; 423/594.15, 598; 501/10, 501/12, 134; 429/231.1, 322, 231.5, 231.95
See application file for complete search history.

(56) References Cited

U.S. PATENT DOCUMENTS

| | | | | |
|---|---|---|---|---|
| 5,242,674 A * | 9/1993 | Bruno et al. | ............. | 252/519.1 |
| 5,571,637 A * | 11/1996 | Idota | ......................... | 429/338 |
| 6,391,492 B1 * | 5/2002 | Kawakami et al. | ......... | 429/209 |
| 6,749,648 B1 * | 6/2004 | Kumar et al. | .............. | 29/623.1 |
| 6,827,921 B1 * | 12/2004 | Singhal et al. | .............. | 423/598 |
| 6,890,510 B2 * | 5/2005 | Spitler et al. | ............... | 423/598 |
| 2002/0015881 A1 * | 2/2002 | Nakamura et al. | .......... | 429/111 |
| 2002/0102205 A1 * | 8/2002 | Amatucci | .................... | 423/598 |
| 2004/0101755 A1 * | 5/2004 | Huang et al. | ............ | 429/231.1 |

OTHER PUBLICATIONS

Kavan et al, "Facile Synthesis of nanocrystalline Li4Ti5O12 (Spinel) Exhibiting Fast Li Insertion," Electrochemical and Solid State Letters, 2002, 5(2), A39-A42.*
Electrochemical and Solid-State Letters (2002), 5(2), A39-A42, Kavan et al.
Journal of Power Sources, Elsevier Sequoia S.A. Lausanne, CH, vol. 81-82, Sep. 1999, p. 352-357 is listed in the international search report in category "A".

* cited by examiner

Primary Examiner—Stanley S. Silverman
Assistant Examiner—Kallambella Vijayakumar
(74) Attorney, Agent, or Firm—Novak Druce + Quigg LLP

(57) ABSTRACT

Process for preparing nanocrystalline lithium titanate spinels by reacting lithium hydroxide and a titanium alkoxide at elevated temperature in a reaction mixture which forms water of reaction.

6 Claims, No Drawings

PREPARATION OF NANOCRYSTALLINE LITHIUM TITANATE SPINELS

The present invention relates to a process for preparing nanocrystalline lithium titanate spinels by reacting lithium hydroxide and titanium alkoxides at elevated temperature in a reaction mixture which forms water of reaction.

The preparation of nanocrystalline lithium titanate spinels by reacting lithium ethoxide and titanium (IV) alkoxides by the sol-gel method at elevated temperature is known from Electrochemical and Solid-State Letters (2002), 5 (2), A39-A42.

Disadvantages of this process are the gel formed and its work-up.

It is an object of the present invention to remedy the abovementioned disadvantages.

We have found that this object is achieved by a new and improved process for preparing nanocrystalline lithium titanate spinels, which comprises reacting lithium hydroxide and a titanium alkoxide at elevated temperature in a reaction mixture which forms water of reaction.

The process of the present invention can be carried out as follows:

The first component for the reaction forming water of reaction, the titanium alkoxide and lithium hydroxide can be placed in a reaction vessel first, after which the second component for the reaction forming water of reaction is added and the reaction is completed at elevated temperature, generally from 50 to 180° C., preferably from 60 to 150° C., particularly preferably from 70 to 140° C., with the proviso that the upper temperature limit is determined by the reflux temperature of the total reaction mixture, and a pressure of from 0.1 to 3 bar, preferably from 0.5 to 2 bar, particularly preferably at atmospheric pressure.

The solid obtained, viz. the nanocrystalline lithium titanate particles, are generally isolated by evaporation of the reaction mixture and subsequent drying, preferably spray drying.

The molar ratio of titanium alkoxide to the first component for the reaction forming water of reaction is generally from 0.8:1 to 50:1, preferably from 0.95:1 to 10:1, particularly preferably from 1:1 to 5:1, in particular from 1:1 to 3:1. The molar ratio of the first component to the second component for the reaction forming water of reaction is generally from 3:1 to 0.95:1, preferably from 2.5:1 to 1:1, particularly preferably from 1:1 to 1.5:1.

The reactions forming water of reaction can be, for example, esterifications, amide formation reactions or etherifications, but are preferably esterifications, particularly preferably esterifications among components which are present in the reaction mixture, for example ether alcohols.

In the case of an esterification reaction as source of the water of reaction, preference is given to firstly placing the alcohol component in the reaction vessel as first component, for example together with the titanium alkoxide and, if desired, the lithium hydroxide and adding an organic acid as second component, preferably dropwise, to the mixture of the abovementioned three (3) components.

Lithium hydroxide can be used in solid form, for example as powder, spheres, pellets or in any other shapes. The lithium hydroxide used is generally dry or water-free, i.e. aqueous lithium hydroxide solutions are not used and no water is added.

Suitable titanium alkoxides are, for example, titanium tetramethoxide, titanium tetraethoxide, titanium tetra-n-propoxide, titanium tetraisopropoxide, titanium tetra-n-butoxide, titanium tetraisobutoxide, titanium tetra-sec-butoxide, titanium tetra-tert-butoxide, titanium tetra-n-pentoxide and titanium tetraisopentoxide, preferably titanium tetraethoxide, titanium tetra-n-propoxide, titanium butoxide, titanium tetra-sec-butoxide and titanium tetra-tert-butoxide, particularly preferably titanium tetra-n-propoxide, titanium tetraisopropoxide, titanium tetra-n-butoxide and titanium tetraisobutoxide, or mixtures thereof.

Suitable first components for the reaction forming water of reaction are organic solvents, suspension media or dispersion media, in general polar organic solvents, suspension media or dispersion media, in particular aliphatic alcohols, ether alcohols or mixtures thereof having a boiling point below about 300° C. under atmospheric pressure. These can be used in anhydrous form or preferably in commercial form which is not free of water, but no additional water is added.

Suitable alcohols are $C_1$-$C_8$-alkanols, preferably $C_1$-$C_4$-alkanols such as methanol, ethanol, n-propanol, isopropanol, n-butanol, isobutanol, sec-butanol or tert-butanol, particularly preferably $C_1$-$C_3$-alkanols such as methanol, ethanol, n-propanol or isopropanol, in particular methanol or ethanol.

Suitable ether alcohols are all known glycol ethers such as ethylene glycol monomethyl ether, ethylene glycol monoethyl ether, ethylene glycol mono-n-propyl ether, ethylene glycol monoisopropyl ether, ethylene glycol mono-n-butyl ether, ethylene glycol monoisobutyl ether, ethylene glycol mono-sec-butyl ether, ethylene glycol tert-butyl ether, diethylene glycol monomethyl ether, diethylene glycol monoethyl ether, diethylene glycol mono-n-propyl ether, diethylene glycol monoisopropyl ether, diethylene glycol mono-n-butyl ether, diethylene glycol monoisobutyl ether, diethlyene glycol mono-sec-butyl ether, diethylene glycol tert-butyl ether, preferably ethylene glycol monoethyl ether, ethylene glycol mono-n-propyl ether, ethylene glycol monoisopropyl ether, ethylene glycol mono-n-butyl ether, ethylene glycol monoisobutyl ether, ethylene glycol mono-sec-butyl ether, ethylene glycol tert-butyl ether, diethylene glycol monoethyl ether, diethylene glycol mono-n-propyl ether, diethylene glycol monoisopropyl ether, diethylene glycol mono-n-butyl ether, diethylene glycol monoisobutyl ether, diethylene glycol mono-sec-butyl ether and diethylene glycol tert-butyl ether, particularly preferably ethylene glycol mono-n-propyl ether, ethylene glycol monoisopropyl ether, ethylene glycol mono-n-butyl ether, ethylene glycol monoisobutyl ether, ethylene glycol mono-sec-butyl ether, ethylene glycol tert-butyl ether, diethylene glycol mono-n-propyl ether, diethylene glycol monoisopropyl ether, diethylene glycol mono-n-butyl ether, diethylene glycol monoisobutyl ether, diethylene glycol mono-sec-butyl ether and diethylene glycol tert-butyl ether, in particular ethylene glycol monoisopropyl ether, ethylene glycol monoisobutyl ether, ethylene glycol tert-butyl ether, diethylene glycol monoisopropyl ether, diethylene glycol monoisobutyl ether and diethylene glycol tert-butyl ether.

Suitable second components for the reaction forming water of reaction are organic acids such as carboxylic acids, for example formic acid, acetic acid, propionic acid or orthocarboxylates such as trimethyl orthoformate or mixtures thereof having a boiling point below about 300° C. under atmospheric pressure. These can be used in anhydrous form or preferably in commercial form which is not free of water, but no additional water is added.

The nanocrystalline lithium titanate spinels of the present invention generally have a particle size of from 1 to 200 nm, preferably from 1 to 50 nm, particularly preferably from 1 to 20 nm, in particular from 1 to 15 nm, especially preferably from 1 to 10 nm, very particularly preferably from 2 to 8 nm.

The nanocrystalline lithium titanate spinels of the present invention are suitable as anode material for rechargeable lithium batteries.

For use of the nanocrystalline lithium titanate spinels of the present invention as anode material for rechargeable lithium batteries, the spinel material can be sintered at from 350 to 700° C., preferably from 400 to 690° C., more preferably from 450 to 680° C.

EXAMPLES

Example 1

Under a nitrogen atmosphere, 110 g of butyl glycol, 5×1/30 mol, altogether 55.8 g, of titanium tetrabutoxide, 4×1/30 mol, altogether 3.2 g, of anhydrous lithium hydroxide and 8×1/30 mol, altogether 16.0 g, of acetic acid were combined while stirring and reacted at 120° C. for 24 hours. A white suspension was obtained after cooling. The primary particle size of the $Li_4Ti_5O_{12}$ formed was 1-3 nm.

Example 1a

Part of the suspension obtained in Example 1 was dried. It was examined by means of a heated X-ray camera to determine the temperature at which narrowing of the X-ray reflections commences, which is a temperature at which densification of the material generally commences. In the present example, this temperature is in the range from 500 to 600° C., while establishment of crystalline order is complete above about 400° C.

Example 2

The reaction was carried out in a manner analogous to Example 1, but 10×1/30 mol of acetic acid was used. The dispersion obtained was more viscous than that of Example 1. The primary particle size of the $Li_4Ti_5O_{12}$ formed was 1-3 nm. However, the primary particles were joined to form larger aggregates than in Example 1.

Example 3

The reaction was carried out in a manner analogous to Example 1, but 12×1/30 mol of acetic acid was used. The dispersion obtained was more viscous than that of Example 2. The primary particle size of the $Li_4Ti_5O_{12}$ formed was 2-4 nm. However, the primary particles were joined to form larger aggregates than in Example 2.

Example 4

The reaction was carried out in a manner analogous to Example 1, but 16×1/30 mol of acetic acid was used. The dispersion obtained was more viscous than that of Example 3. The primary particle size of the $Li_4Ti_5O_{12}$ formed was 2-4 nm. However, the primary particles were joined to form larger aggregates than in Example 3.

We claim:

1. A process for preparing nanocrystalline lithium titanate spinels, which comprises reacting lithium hydroxide and a titanium alkoxide at from 50 to 180° C. in a reaction mixture which forms water of reaction, wherein the reaction mixture consists essentially of lithium hydroxide, titanium alkoxide, as well as an alcohol or a glycol ether as a first component and a carboxylic acid or a mixture of carboxylic acids as a second component wherein said nanocrystalline lithium titanate spinels have a particle size from 1 to 10 nm.

2. A process for preparing nanocrystalline lithium titanate spinels as claimed in claim 1, wherein the reaction is carried out at a pressure of from 0.1 to 3 bar.

3. A process for preparing nanocrystalline lithium titanate spinels as claimed claim 1, wherein a molar ratio of titanium alkoxide to the first component for the reaction forming water of reaction is from 0.8:1 to 50:1.

4. A process for preparing nanocrystalline lithium titanate spinels as claimed in claim 3, wherein a molar ratio of the first component to the second component for the reaction forming water of reaction is from 3:1 to 0.95:1.

5. A process for preparing nanocrystalline lithium titanate spinels as claimed claim 1, wherein the spinels are sintered at from 350 to 700° C.

6. A process for preparing nanocrystalline lithium titanate spinels as claimed in claim 1, wherein the particle size is from 2 to 8 nm.

* * * * *